(12) United States Patent
Zhou et al.

(10) Patent No.: US 12,187,628 B2
(45) Date of Patent: Jan. 7, 2025

(54) SYSTEMS AND METHODS FOR DISINFECTING FLUIDS

(71) Applicant: Georgia Tech Research Corporation, Atlanta, GA (US)

(72) Inventors: Jianfeng Zhou, Atlanta, GA (US); Xing Xie, Atlanta, GA (US); Ting Wang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 809 days.

(21) Appl. No.: 17/266,678

(22) PCT Filed: Aug. 14, 2019

(86) PCT No.: PCT/US2019/046461
§ 371 (c)(1),
(2) Date: Feb. 8, 2021

(87) PCT Pub. No.: WO2020/037021
PCT Pub. Date: Feb. 20, 2020

(65) Prior Publication Data
US 2021/0300797 A1    Sep. 30, 2021

Related U.S. Application Data

(60) Provisional application No. 62/718,462, filed on Aug. 14, 2018.

(51) Int. Cl.
*C02F 1/46* (2023.01)
*C02F 1/461* (2023.01)
*C02F 1/467* (2023.01)

(52) U.S. Cl.
CPC ........ *C02F 1/4606* (2013.01); *C02F 1/46109* (2013.01); *C02F 1/467* (2013.01);
(Continued)

(58) Field of Classification Search
None
See application file for complete search history.

(56) References Cited

U.S. PATENT DOCUMENTS 5,326,530 A * 7/1994 Bridges .................. A61L 11/00
422/906
5,753,100 A * 5/1998 Lumsden ............ C02F 1/46104
205/742

(Continued)

FOREIGN PATENT DOCUMENTS

| CN | 2031679 | 2/1989 |
|---|---|---|
| CN | 2183181 | 11/1994 |
| CN | 204281730 | 4/2015 |

OTHER PUBLICATIONS

Rebersek, et, al. Cell Membrane Electroporation—Part 3: The Equipment, 2014, IEEE Electrical Insulation Magazine (Year: 2014).*

(Continued)

*Primary Examiner* — Bradley R Spies
*Assistant Examiner* — Jeannie McDermott
(74) *Attorney, Agent, or Firm* — Troutman Pepper Hamilton Sanders LLP; Ryan A. Schneider; Dustin B. Weeks

(57) ABSTRACT

An exemplary embodiment of the present invention provides a system for disinfecting a fluid. The system can comprise: a cylindrically-shaped outer electrode defining an internal cavity: a center electrode positioned within the internal cavity, the center electrode extending along at least a portion of a longitudinal axis of the outer electrode: an inlet positioned proximate a first end of the outer electrode and configured to allow a fluid to pass from an area external to the internal cavity into the internal cavity; and an outlet positioned proximate a second end of the outer electrode and configured to allow the fluid to pass from the internal cavity into an area external to the internal cavity. The outer (Continued)

electrode and the center electrode can comprise at least one metal selected from the group consisting of copper, silver, and zinc.

27 Claims, 10 Drawing Sheets

(52) U.S. Cl.
CPC ............ *C02F 2001/46133* (2013.01); *C02F 2001/46171* (2013.01); *C02F 2201/003* (2013.01); *C02F 2303/04* (2013.01)

(56) References Cited

U.S. PATENT DOCUMENTS

| | | |
|---|---|---|
| 9,512,018 B1 * | 12/2016 | Kolls .................... C02F 1/48 |
| 2004/0022669 A1 | 2/2004 | Ruan et al. |
| 2017/0081221 A1 * | 3/2017 | Namihira .............. B03C 1/02 |
| 2018/0002203 A1 * | 1/2018 | Yokoyama ......... H05H 1/2406 |

OTHER PUBLICATIONS

Hou, et al., Nanowire Modified Three-Dimensional Electrode Enabling Low-Voltage Electroporation for Water Disinfection, Environ. Sci. Technol. 2016, 50, 7641-76. (Year: 2016).*

Search Report and Written Opinion from Application No. PCT/US2019/046461 dated Oct. 29, 2019 (13 pages).

* cited by examiner

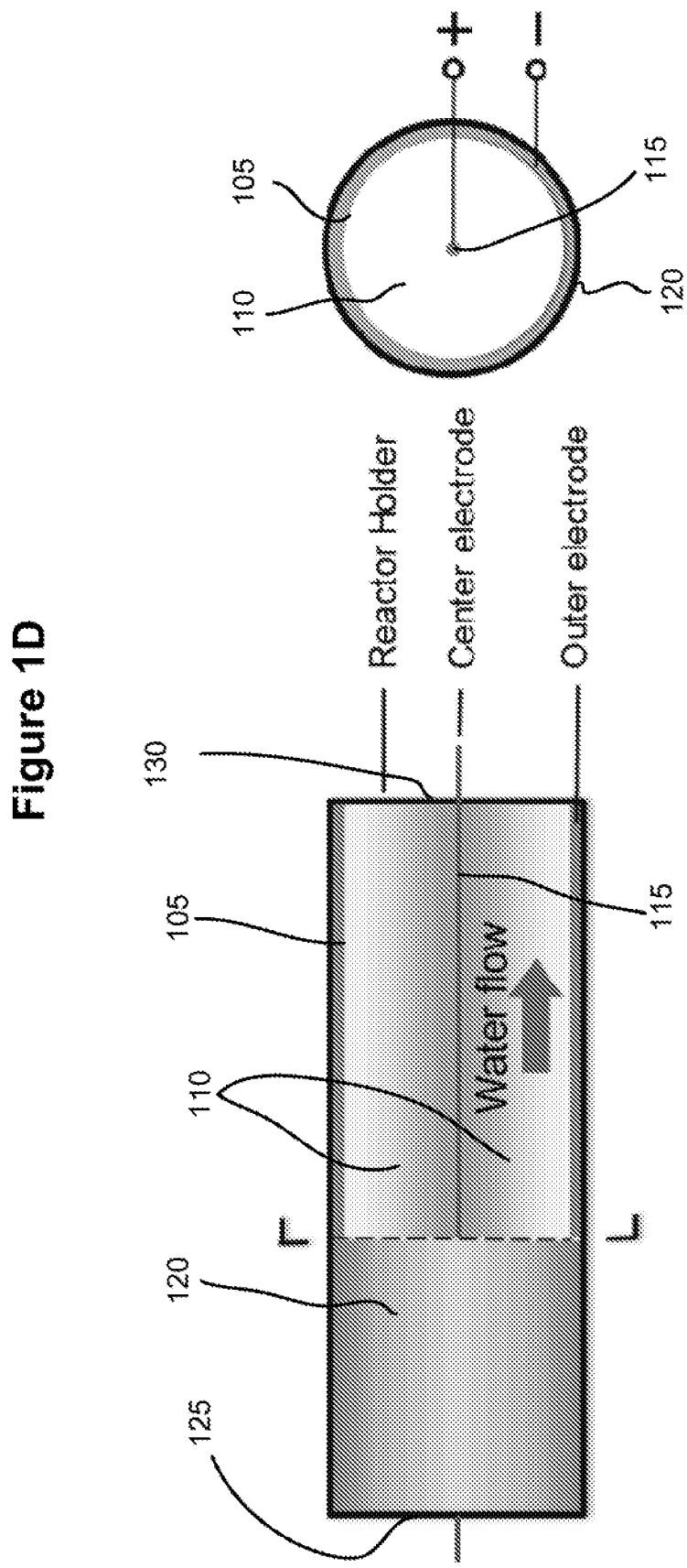

SYSTEMS AND METHODS FOR DISINFECTING FLUIDS

CROSS-REFERENCE TO RELATED APPLICATIONS

This application claims the benefit of U.S. Provisional Application Ser. No. 62/718,462, filed on Aug. 14, 2018, which is incorporated herein by reference in its entirety as if fully set forth below.

TECHNICAL FIELD OF THE INVENTION

The various embodiments of the present disclosure relate generally to systems and methods for disinfecting fluids.

BACKGROUND OF THE INVENTION

Disinfection techniques, such as chlorination, ultraviolet (UV), and ozonation, have been developed to remove or inactivate pathogens and typically take place in centralized drinking water treatment plants. Nevertheless, centralized disinfection facilities do not fulfill all treatment requirements in the modern society. First, even today, one in nine people in the world still do not have clean water close to home. Most of these people live in developing areas, where centralized water treatment plants are not applicable because of the unaffordable capital cost and the obstacle in chemical transportation. Second, the water produced in centralized facilities needs to be distributed to end users through pipelines, most of which are underground. The leakage of these pipelines may cause secondary contamination in the water distribution system. In addition, centralized facilities are vulnerable when facing natural disasters such as hurricanes and earthquakes. The causes for the failure of the drinking water systems include the shortage of chlorine (due to either transportation system disruption or storage spillage) and the rupture of the water distribution pipelines.

One alternative strategy to overcome the above obstacles of centralized systems is to disinfect water at the point of use (POU). First, the POU method can be more cost-effective because only a small portion of water needs to be treated for drinking purpose. Second, treating water at the POU avoids the risk of secondary contamination. Last, POU water disinfection is more resistant to natural disasters because it has smaller foot-print and it can be independent to grid electricity and transportation system.

Several conventional POU techniques exist. Chlorination, the most common conventional technique for centralized disinfection, has also been used at the POU. A survey investigation reports the risk reduction of diarrhea after the adoption of chlorination kits. Another conventional technique—UV disinfection—has been installed in developing countries for POU treatment. Especially, the conventional UV lamp systems for household water purification are portable, simple to operate, and compatible with other water treatment equipment. Another conventional technique—POU membrane technology (e.g., ultrafiltration, nanofiltration, and reverse osmosis)—is a chemical-free process with high bacterial removal efficiency. The membrane filtration removes not only water-borne pathogens, but also dissolved and suspended species according to the pore sizes of the membrane. These existing conventional techniques, however, suffer from drawbacks such as producing disinfection by-products (DBPs), extensive energy consumption, fouling, and high maintenance cost. Other conventional disinfection methods assisted with new materials such as photo-catalytic processes, low-voltage electroporation, and microwave treatment demonstrate potential in POU treatment in the lab, but need more evaluation on their accessibility and reliability. Therefore, it is still of great interest for scientists to develop new POU disinfection methods as an efficient approach for certain circumstances where the centralized treatment facilities are not the best option.

Copper, with its ionized forms, oxides, and chelates, has been identified to possess biocidal effect and widely used as a water purifier in our daily life. The toxicity of Cu ions against microorganisms occurs through two mechanisms, including cell membrane damage and interactions with intracellular substances. Exposed to a high-copper environment, the microbial cells show a rapid decline in membrane integrity, and thus a leakage of intercellular solutes. After uptake by the bacterial cells, copper ions can interact with intercellular nucleic acids, protein, enzymes, and metabolites, and thus cause inactivation. Copper sulfate ($CuSO_4$) has been used as an algaecide for lake water and swimming pools. More than 300 hospitals have installed the copper-silver ionization systems as a primary pathogen control method. Though toxic to microorganisms, copper is relatively less toxic to mammals with the same dosage. Functioning as a catalytic cofactor for enzyme and respiration processes, copper is considered essential as a trace element for human health. A recommended dietary allowance of copper is 900 µg/day by the US Institute of Medicine. After meeting the nutrient requirement, the human body can excrete extra copper in the feces. Nevertheless, a superfluous consumption of Cu (10 mg/day) causes serious physical disorders in human bodies, such as gastrointestinal distress, liver damage, and immune system disorders. To prevent potential health problems in drinking water, a maximum contaminant level goal of 1.3 mg/L has been established for copper by U.S. Environmental Protection Agency.

Previous studies about copper disinfection have focused on the fabrication of copper nanoparticles (NPs) on a fixed substrate (e.g., CuNP-modified filter) or combined with organic and inorganic moieties. Besides, the copper ionization devices have been applied in water distribution systems to control pathogen growth by electrochemically released Cu ions. Recently, the biocidal effect of copper oxide NPs, chlorhexidine doped copper particles, and zeolite-rich copper solids are also confirmed for water disinfection. The most significant draw back of the existing Cu-based techniques, however, is the high Cu concentration (600-2000 µg/L) remaining in the treated water, which limits the application for drinking water disinfection. On the other hand, low Cu usage cannot fulfill the fundamental disinfection purpose, or requires long treatment time (>11 hours).

Therefore, there is a desire for improved systems and methods for disinfecting water. Various embodiments of the present invention address these desires.

BRIEF SUMMARY OF THE INVENTION

The present invention relates to systems and methods for disinfecting a fluid.

An exemplary embodiment of the present invention provides a system for disinfecting a fluid. The system can comprise: a cylindrically-shaped outer electrode having an internal cavity: a center electrode positioned within the internal cavity, the center electrode extending along at least a portion of a longitudinal axis of the outer electrode: an inlet positioned proximate a first end of the outer electrode and configured to allow a fluid to pass from an area external to the internal cavity into the internal cavity; and an outlet positioned proximate a second end of the outer electrode and configured to allow the fluid to pass from the internal cavity into an area external to the internal cavity. The outer electrode and the center electrode can comprise at least one metal selected from the group consisting of copper, silver, and zinc.

In any of the embodiments disclosed herein, the outer electrode and the center electrode can comprise copper.

In any of the embodiments disclosed herein, the system can further comprise a voltage supply configured to supply a voltage across the outer electrode and center electrode and generate a non-uniform electric field distribution on a cross-sectional plane of the system.

In any of the embodiments disclosed herein, the non-uniform electric field distribution is represented by the following equation:

$$E_s = \frac{U}{s \cdot \ln \frac{r_{center}}{r_{outer}}},$$

wherein $E_s$ is the magnitude of the electric field at a position on the cross-sectional plane at a distance of s from the center, U is the voltage across the outer electrode and the center electrode, $r_{center}$ is the radius of the center electrode, and $r_{outer}$ is the radius of the outer electrode.

In any of the embodiments disclosed herein, the system can further comprise a body surrounding the outer electrode.

In any of the embodiments disclosed herein, the body can comprise acrylic.

In any of the embodiments disclosed herein, when a voltage of 1.5V is applied across the center electrode and outer electrode and a fluid is permitted to flow through the internal cavity with a hydraulic retention time of one minute, the system can be configured to increase the concentration of the copper to the fluid between 150 µg/L and 250 µg/L.

In any of the embodiments disclosed herein, when a voltage of 1.5V is applied across the center electrode and outer electrode and a fluid is permitted to flow through the internal cavity with a hydraulic retention time of one minute, the system can be configured to increase the concentration of the copper to the fluid between 175 µg/L and 225 µg/L.

In any of the embodiments disclosed herein, when a voltage of 1.5V is applied across the center electrode and outer electrode and a fluid is permitted to flow through the internal cavity with a hydraulic retention time of one minute, the system can be configured to reduce E. coli from the fluid at an efficiency of between 5 log and 7 log.

In any of the embodiments disclosed herein, when a voltage of 1.5V is applied across the center electrode and outer electrode and a fluid is permitted to flow through the internal cavity with a hydraulic retention time of one minute, the system can be configured to reduce E. coli from the fluid at an efficiency of about 6 log.

In any of the embodiments disclosed herein, the center electrode can have a diameter of between 50 µm and 100 µm.

In any of the embodiments disclosed herein, the center electrode can have a diameter of between 70 µm and 80 µm.

In any of the embodiments disclosed herein, the system can be configured as a point-of-use fluid disinfecting system.

In any of the embodiments disclosed herein, the fluid can be water.

Another embodiment provides a method for disinfecting a fluid. The method can comprise providing a fluid disinfection system comprising: a cylindrically-shaped outer electrode having an internal cavity: a center electrode positioned within the internal cavity, the center electrode extending along at least a portion of a longitudinal axis of the outer electrode; an inlet positioned proximate a first end of the outer electrode and in fluid communication with the internal cavity; and an outlet positioned proximate a second end of the outer electrode and in fluid communication with the internal cavity. The outer electrode and the center electrode can comprise at least one metal selected from the group consisting of copper, silver, and zinc. The method can further comprise: causing a fluid to flow through the inlet and into the internal cavity, the fluid comprising at least one living contaminant at a first concentration upon entering the inlet: applying a voltage across the center electrode and the outer electrode; and causing the fluid to flow through the internal cavity and out of the outlet, wherein a second concentration of the living contaminant upon exiting the outlet is less than the first concentration.

In any of the embodiments disclosed herein, applying a voltage across the center electrode and the outer electrode can generate a non-uniform electric field distribution on a cross-sectional plane of the system.

In any of the embodiments disclosed herein, the voltage can be 1.5V and the fluid can be flowed through the internal cavity with a hydraulic retention time of one minute.

In any of the embodiments disclosed herein, a concentration of copper in the fluid existing the outlet can be between 150 µg/L and 250 µg/L.

In any of the embodiments disclosed herein, a concentration of copper in the fluid existing the outlet is between 175 µg/L and 225 µg/L.

In any of the embodiments disclosed herein, a concentration of E. coli in the fluid exiting the outlet can be reduced at an efficiency of between 5 log and 7 log relative to a concentration of E. coli in the fluid entering the inlet.

In any of the embodiments disclosed herein, a concentration of E. coli in the fluid exiting the outlet can be reduced at an efficiency of about 6 log relative to a concentration of E. coli in the fluid entering the inlet.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

FIG. 1D provides a schematic diagram showing a front view and cross-sectional view of a fluid disinfection system, in accordance with an exemplary embodiment of the present invention.

DETAILED DESCRIPTION OF THE INVENTION

To facilitate an understanding of the principles and features of the present invention, various illustrative embodiments are explained below. To simplify and clarify explanation, the invention is described below as employing copper to disinfect water. One skilled in the art will recognize, however, that the invention is not so limited. Instead, as those skilled in the art would understand, the various embodiments of the present invention also find application in other areas, including, but not limited to, disinfecting other fluids using other metals, e.g., silver, zinc, and combinations thereof.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

Figure 1A:
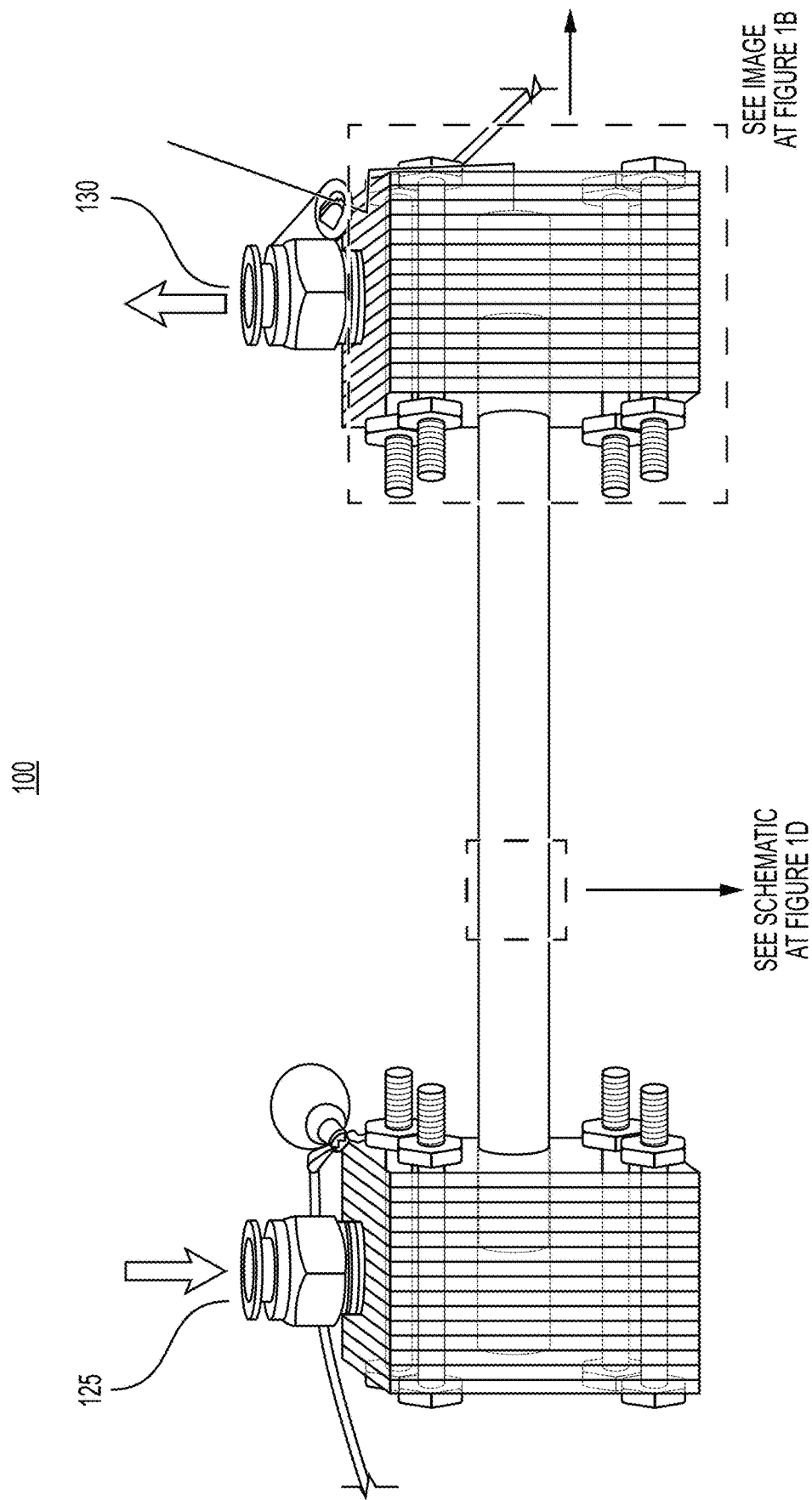
FIG. 1A provides a front view image of a fluid disinfection system, in accordance with an exemplary embodiment of the present invention.

As shown in FIG. 1A-D, an exemplary embodiment provides a system for disinfecting a fluid 100. The system can comprise an outer electrode 105. In some embodiments, the outer electrode 105 can be cylindrical-shaped. The invention, however, is not so limited: rather, in some embodiments, the outer electrode 105 can have other shapes. The outer electrode 105 can define an internal cavity 110. In some embodiments, the outer electrode 105 can comprise a solid sheet of metal (as shown in FIG. 1D). In some embodiments, however, the outer electrode 105 can comprise a plurality of electrodes that collectively form the cylindrical shape (not shown). The plurality of electrodes can be in electrical communication with each other, such that the voltage drop from one of the plurality of electrodes to another of the plurality of electrodes is substantially zero. The outer electrode 105 can comprise one or more metals. The one or more metals can be selected from the group consisting of copper, silver, and zinc.

The system can further comprise a center electrode 115. The center electrode 115 can be positioned within the internal cavity 110. The center electrode 115 can also extend along at least a portion of a longitudinal axis of the outer electrode 105. In some embodiments, the center electrode 115 can extend along the entirety of the longitudinal axis of the outer electrode 105. The center electrode 115 can be in the form of a cylindrical wire. The center electrode 115 can have many different diameters, including, but not limited to, 50-100 µm, 60-90 µm, and 70-80 µm. The center and outer electrodes can be coaxial with one another. The center electrode 115 can comprise one or more metals. The one or more metals can be selected from the group consisting of copper, silver, and zinc.

The system can further comprise and inlet 125 and an outlet 130. The inlet 125 can be positioned at a first end of the outer electrode 105, and the outlet 130 can be positioned at a second end of the outer electrode 105. The inlet 125 and outlet 130 can be used to direct fluid from an area external to the system, into the inlet 125, through the internal cavity 110, and out of the outlet 130. For example, the inlet 125 can be connected to a water source and can receive contaminated water. The contaminated water can enter the system through the inlet 125 where it becomes disinfected as it moves through the internal cavity 110 before exiting the outlet 130. Water exiting the outlet 130 can then drank safely. Such a system is an exemplary point-of-use system.

The system can also comprise a voltage supply, the voltage supply can be many different voltage supplies known in the art, including, but not limited to, one or more batteries, voltage from the utility grid, an electric generator, and the like. The voltage supply can be configured to apply a voltage across the center and outer electrodes. The voltage can generate a non-uniform electric field distribution on a cross-sectional plane of the system.

The system can further comprise a body 120 surrounding the outer electrode 105. The body 120 can be many different shapes, including, but not limited to, cylindrical, rectangular, and the like. The body 120 can be made of many different materials. In an exemplary embodiment, the body 120 can comprise acrylic.

The system can be used to disinfect a fluid, such as water, without increasing the concentration of the fluid exiting system to dangerous levels. For example, in accordance with various embodiments, when a voltage of 1.5V is applied across the center electrode 115 and outer electrode 105 and a fluid is permitted to flow through the internal cavity 110 with a hydraulic retention time of one minute, the system can be configured to increase the concentration of the copper to the fluid between 150 µg/L and 250 µg/L, between 175 µg/L and 225 µg/L, between 185 µg/L and 215 µg/L, between 190 µg/L and 210 µg/L, between 195 µg/L and 205 µg/L, between 200 µg/L and 300 µg/L, between 200 µg/L and 275 µg/L, between 200 µg/L and 250 µg/L, between 200 µg/L and 225 µg/L.

Various embodiments can also efficiently disinfect fluid. For example, in various embodiments, when a voltage of 1.5V is applied across the center electrode 115 and outer electrode 105 and a fluid is permitted to flow through the internal cavity 110 with a hydraulic retention time of one minute, the system can be configured to reduce *E. coli* from the fluid at an efficiency of between 5 log and 7 log, between 6 log and 8 log, between 6 log and 7 log, or by about 6 log.

EXAMPLES

An exemplary embodiment will now be described in the form of a tubular coaxial-electrode copper ionization cell (CECIC). Structurally, the CECIC comprises a thin wire electrode (positive) at the center and a coaxial cylindrical electrode (negative). When a low voltage (1.5 V) is applied, copper ions can be released from the positive copper electrode for pathogen inactivation. A non-uniform electric field with enhanced strength is generated near the center electrode attributed to the configuration. The CECIC can achieve superior disinfection (~6-log removal of *E. coli*) with very low Cu concentration (~200 µg/L) in the effluent. Disinfection mechanisms have been studied, and the non-uniform electric field can play an important role. The CECIC has also demonstrated the potential of the long-term operation (12 hours for 7.2 L treated water) as POU water disinfection facilities.

Materials and Methods

The tubular coaxial-electrode copper ionization cell (CECIC) was constructed by placing two electrodes in a cylindrical reactor made of acrylic. A cylindrical copper shim was used to cover the whole internal surface of the tube, serving as the outer negative electrode. A copper wire was hung in the center along the tube, serving as the coaxial center positive electrode. A platinum wire with the same diameter was used in the control experiments. A planar-electrode copper ionization cell (PECIC) with a rectangular chamber was also fabricated for comparison. Both CIC reactors were fabricated in the Biomedical Engineering Design Shop at Georgia Institute of Technology. Water samples containing ~1×10$^7$ colony-forming units (CFU)/mL model bacteria, *E. coli*, were prepared using DI water with pH adjusted to 7 by NaOH solution. For water disinfection experiments, the water samples were pumped through the CICs with flow rates in the range of 2.0 to 20.0 mL/min, corresponding to hydraulic retention times (HRTs) of 5 min to 0.5 min, while a direct-current (DC) voltage (0-3 V) was applied between the two electrodes.

The electric current was monitored during the operation of the CICs. The *E. coli* concentrations in both influent ($C_{in}$) and effluent ($C_{eff}$) samples were quantified by spread plating techniques, and the log removal efficiency was calculated. The Cu concentration was measured by the porphyrin method using the Copper Test Kit and following the vender's manual. Some samples were filtered through 0.45 µm syringe filters to remove the suspended *E. coli* cells so that the concentrations of the total Cu ($Cu_{tot}$), the dissolved Cu ions in the solution ($Cu_{dis}$), and the Cu adsorbed or taken by the cells ($Cu_{bac}$) can be determined. All simulations in this work were conducted using COMSOL Multiphysics.

Results and Discussion

The Tubular Coaxial-Electrode Copper Ionization Cell (CECIC)

Figure 1C:
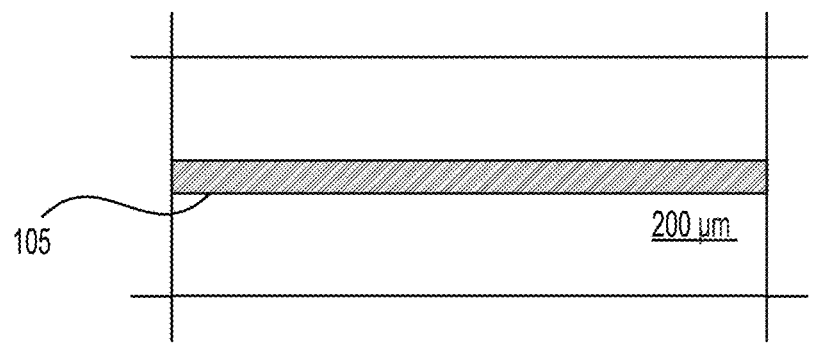
FIG. 1C provides a optical microscope image of a center electrode at a scale of bar=200 µm, in accordance with an exemplary embodiment of the present invention.
Figure 1B:
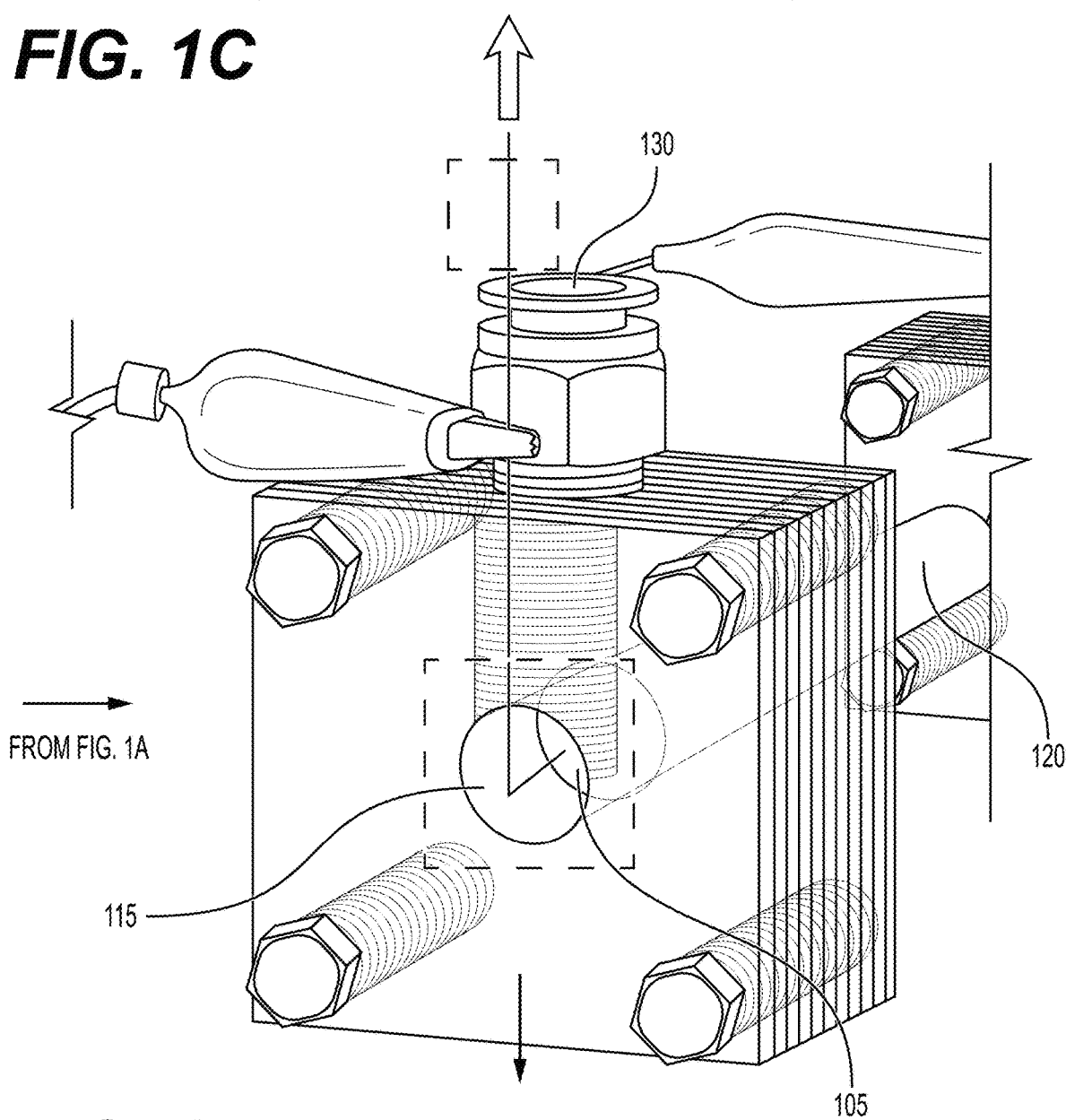
FIG. 1B provides a side view image of a fluid disinfection system, in accordance with an exemplary embodiment of the present invention.
Figure 2A:
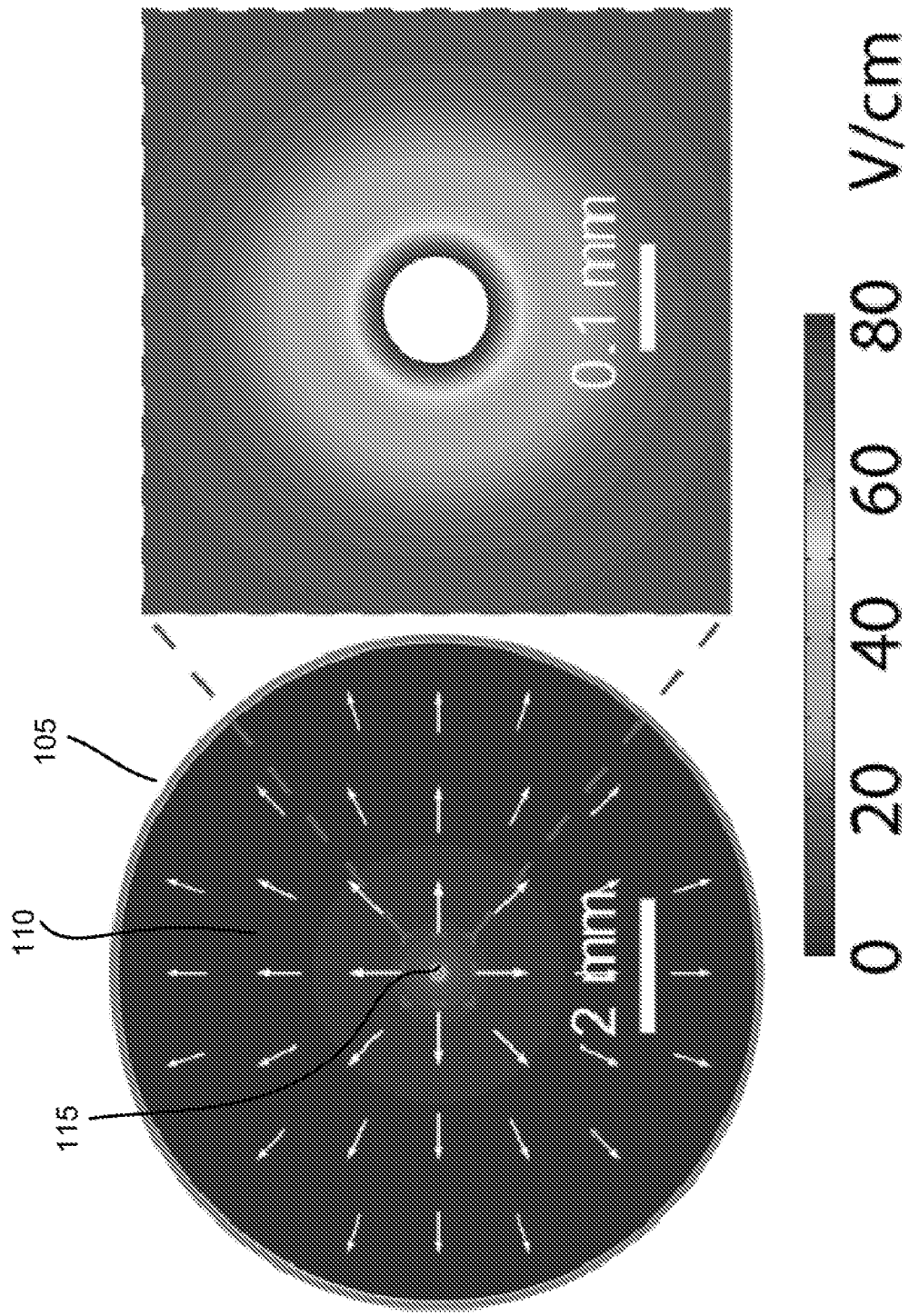
FIG. 2A illustrates the electric field profile on the cross-section of a fluid disinfection system simulated by COMSOL Multiphysics showing a non-uniform distribution, in accordance with an exemplary embodiment of the present invention.

The CECIC comprises a cylindrical treatment chamber in the middle and two tube fitting modules on both sides serving as the inlet and outlet (FIG. 1A). The center and positive electrode is a thin copper wire (76 µm diameter) (FIG. 1B). The outer and negative electrode is a coaxial cylindrical copper shim that covers the whole internal surface of the tube (13.8 cm length, 0.95 cm diameter) (FIG. 1C). The effective volume of the cell is 10 mL. Cu ions release from the center electrode when a voltage is applied between electrodes (FIG. 1D). Attributed to the coaxial center-outer electrode design, a non-uniform electric field with enhanced strength near the center electrode is produced in the chamber. The electric field distribution on the cross-section plane can be depicted in the equation below:

$$i.E_s = \frac{U}{s \cdot \ln\frac{r_{center}}{r_{outer}}}$$

where $E_s$ is the strength of the electric field at the place with a distance of s to the center of the chamber, U is the external applied voltage, $r_{center}$ is the radius of the center electrode, and $r_{outer}$ is the radius of the coaxial outer electrode. The electric field profile of the developed CECIC with an external voltage of 1.5 V is shown in FIG. 2A. A gradient of the electric field strength can be observed. The highest electric field strength reached at the surface of the electrode is >80 V/cm, more than 25 times stronger than the uniform electric field strength between two planar electrodes with the same distance (0.48 cm) and applied voltage (1.5 V).

Performance of the CECIC for Water Disinfection

Figure 2B:
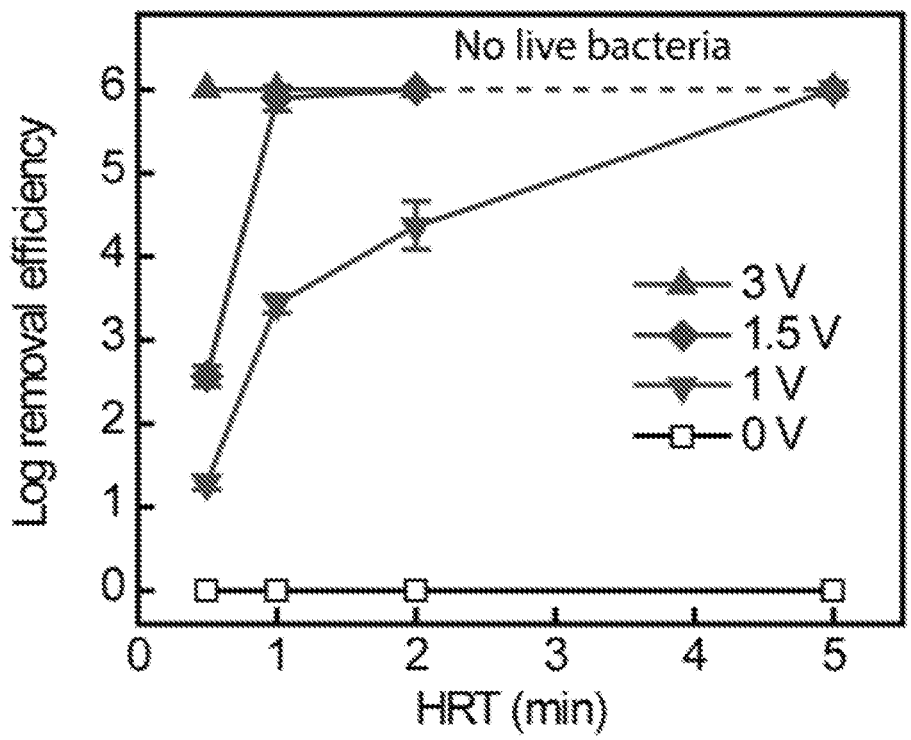
FIG. 2B provides log removal efficiency of *E. coli* by a fluid disinfection system operating at different hydraulic retention times and applied voltages, in accordance with an exemplary embodiment of the present invention.

The disinfection performance of the CECIC was evaluated by treating water samples containing *E. coli*. As shown in FIG. 2B, removal efficiency increased with the increase of applied voltage and HRT. The disinfection effect was negligible when no voltage was applied, indicating that few bacteria were adsorbed to the CECIC or inactivated by direct contact with the electrode surface. The optical density ($OD_{600}$) of the samples before and after treatment confirmed that almost no bacterial cells were attached within the reactor. When the voltage was 3 V, >6-log removal efficiencies were achieved with HRTs of 0.5 to 5 min and no detectable *E. coli* was found in the effluent. When decreasing the voltage to 1 and 1.5 V, long enough HRTs (5 min and 1 min, respectively) were employed to achieve similar removal efficiency (~6-log). For the subsequent study, 1.5 V was selected to achieve high-efficiency bacteria inactivation and at the same time to avoid significant side reactions, such as water splitting.

Figure 2C:
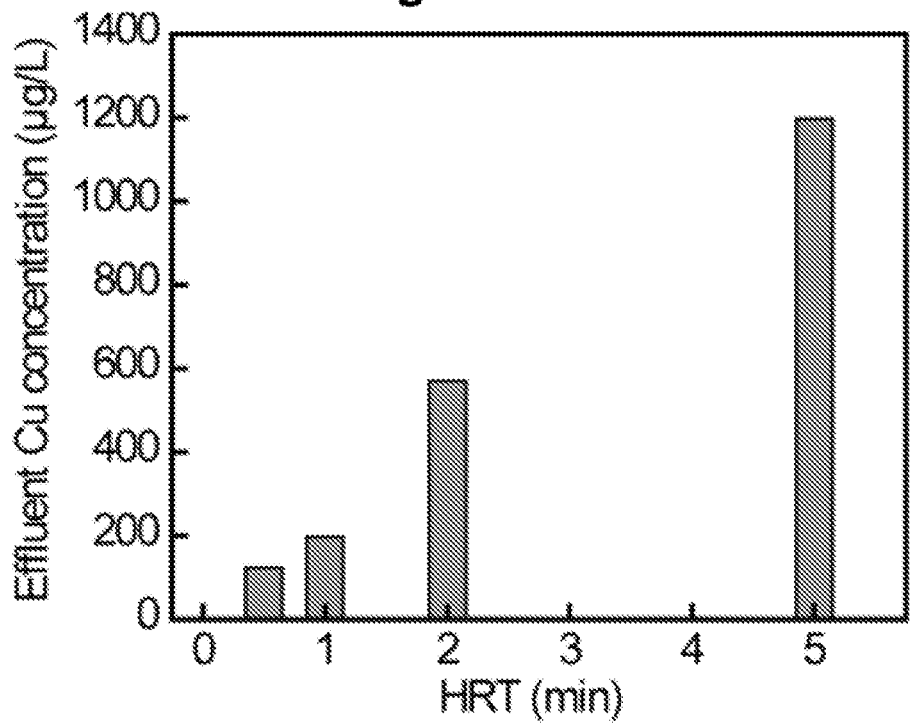
FIG. 2C provides effluent copper concentration when a fluid disinfection system operates at 1.5V with different hydraulic retention times, in accordance with an exemplary embodiment of the present invention.

To evaluate the health risk, the total effluent Cu concentration ($Cu_{tot}$) was measured when the CECIC was operated under 1.5 V with various HRTs. As shown in FIG. 2C, the $Cu_{tot}$ gradually increased along with the HRTs, from 130 to 950 µg/L. Notably, when operating at the HRT of 1 min, the $Cu_{tot}$ was as low as ~200 µg/L and the removal efficiency is ~6 log. Applying this approach for drinking water treatment and considering a daily water intake of 1.5 L for adults, the total Cu uptake is only ~300 µg/day, far less than the recommended dietary allowance of 900 µg/day.

Mechanism Study of the CECIC Disinfection

Bacterial Inactivation by Cu Ions

Figure 3A:
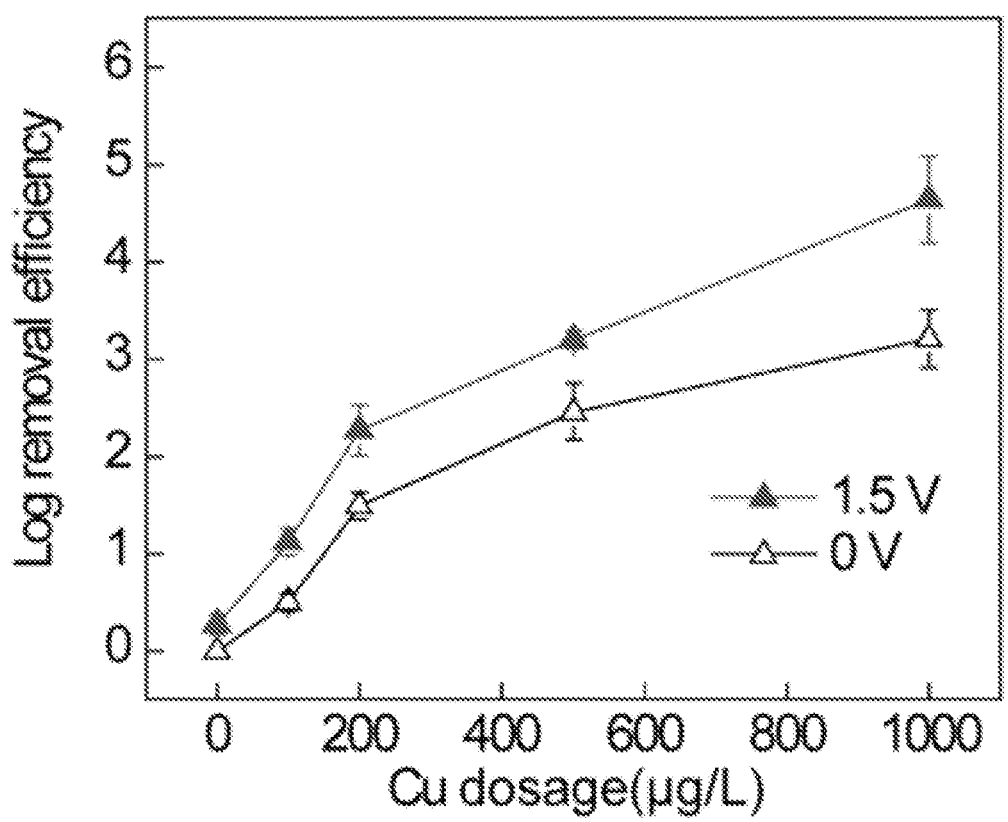
FIG. 3A provides log removal efficiency with different dosage of Cu ions and applied voltage of 0 or 1.5V, showing effects of Cu dosage and electric field exposure at hydraulic retention time of one minute, in accordance with an exemplary embodiment of the present invention.

Cu ions were hypothesized to be the primary disinfectant in the CECIC. To study the contribution of Cu ion disinfection, control experiments were performed in the CECIC without external voltage. Instead, different amount of Cu ions from 200 to 1000 µg/L was dosed intentionally into the initial bacterial solution. In accordance with other studies, the disinfection efficiency increased along with the Cu ion dosage (FIG. 3A, hollow triangles). However, only a 1.5-log removal efficiency was achieved with a Cu ion dosage of 200 µg/L. The normal operated CECIC with a Cu center electrode achieved a ~6-log removal efficiency with ~200 µg/L Cu in the effluent, indicating that other disinfection mechanisms were involved.

Enhanced Cu Uptake by the Microbes Exposing to the Enhanced Electric Field

Exposing bacterial cells to an electric field can cause the structure change of the cell membrane. Fatal membrane damage only occurs when the electric field is sufficiently high (e.g., 10 kV/cm), which may not be applicable to this study. Nevertheless, previous studies have reported that ion transport channels on cell membranes can be activated by slight membrane potential changes. FIG. 3A (solid triangles) shows the results of control experiments performed with a Pt center electrode and the intentionally dosed Cu ions. With an applied voltage of 1.5 V, the removal efficiencies are elevated to the extent of 0.5 to 1 log compared with those without an applied voltage. The enhanced performance confirms the assistance of electric field to the *E. coli* inactivation in the CECIC. In the absence of copper, a 0.23-log removal efficiency is observed at 1.5 V, which may be probably due to the direct oxidation of microbial cells in contact with the positive electrode. Notably, the removal efficiency achieves with a Cu dosage of 200 µg/L and an applied voltage of 1.5 V is 2.3 log, which is still significantly lower than that achieved by the normal CECIC with a Cu center electrode (~6 log) operating with similar parameters (HRT, effluent copper concentration, and applied voltage) (FIG. 2C).

Figure 3C:
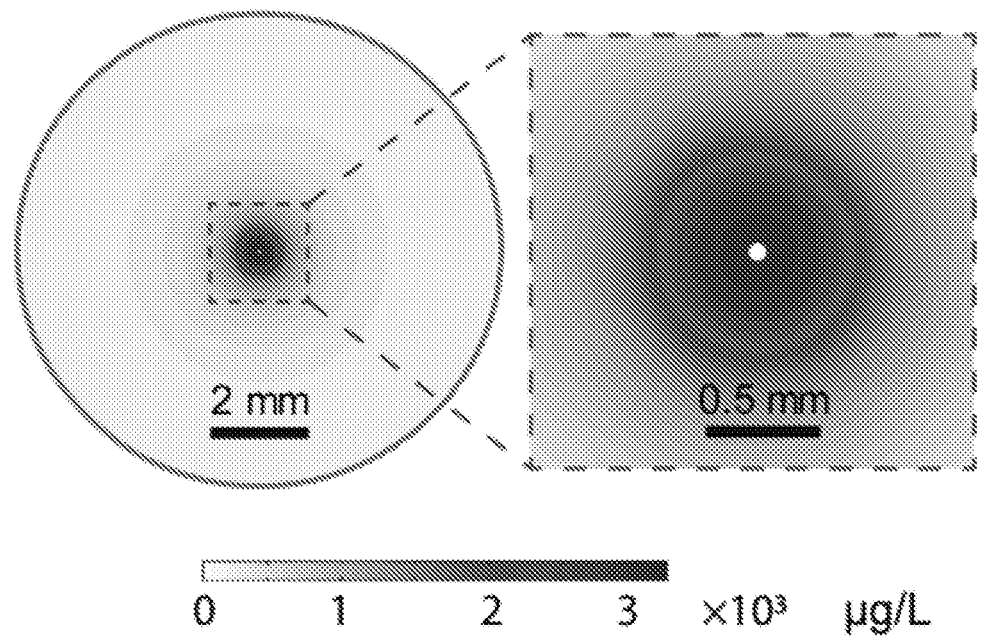
FIG. 3C provides simulated cross-section copper concentration distribution at the outlet of a fluid disinfection system, in accordance with an exemplary embodiment of the present invention.
Figure 3B:
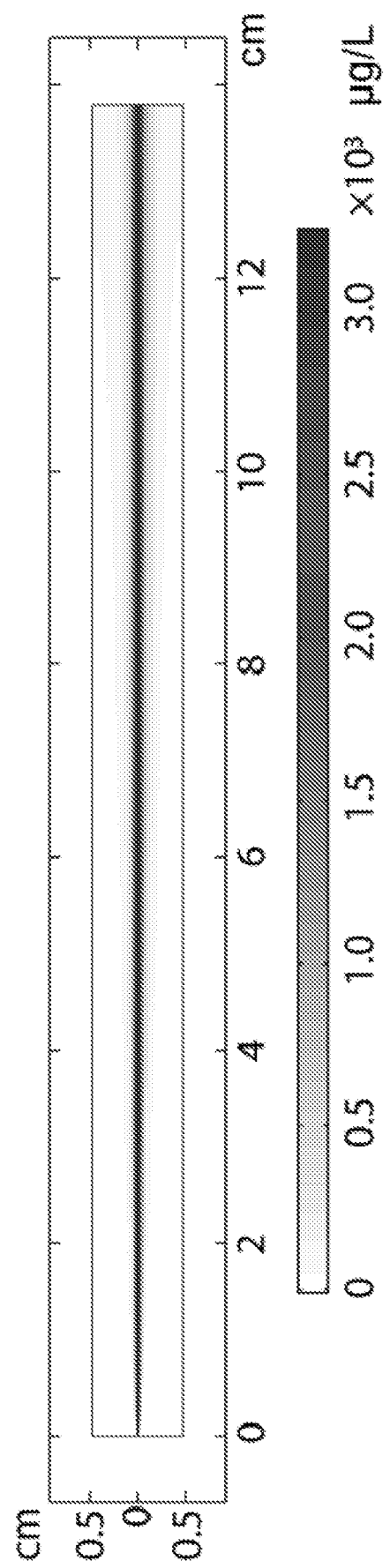
FIG. 3B provides copper concentration distribution along the length of a fluid disinfection system simulated by SOMSOL Multiphysics showing the high Cu concentration near the center electrode, in accordance with an exemplary embodiment of the present invention.

High Cu Ion Concentration Near the Center Electrode Because of In-Situ Cu Ionization During the operation of the normal CECIC with a Cu center electrode, Cu ions are electrochemically released from the center electrode, creating a concentration gradient of Cu ions along the radius. A three-dimensional model was built to simulate the copper distribution in the treatment chamber using COMSOL Multiphysics. As the results in FIG. 3B show, Cu ion concentration is higher near the center electrode and decreases along the radius. Such concentration gradient results from the relatively low migration rate of the Cu ions driven by the Brownian movement and the electric field. The Cu ion concentration reaches 3000 µg/L near the surface of the electrode at the end point of the reactor (FIG. 3C). A high Cu ion concentration (>2000 µg/L) region exists within 0.05 cm from the center electrode. The region of higher Cu ion concentration also has higher electric field strength (FIG. 2A), resulting in the hot spot for microbial inactivation.

Transportation of Bacteria by Electrophoresis and Dielectrophoresis Forces

Another mechanism that plays a role in water disinfection by the CECIC is the transportation of bacterial cells in the reactor. When bacterial cells are exposed to an external electric field, they are subjected to two driving forces, including electrophoresis force and dielectrophoresis force. Due to the electrophoresis force, the negatively charged *E. coli* cells tend to move towards the center positive electrode in the CECIC. Dielectrophoresis force ($F_{DEP}$) applies to all dielectric particles (i.e., the bacterial cell) no matter their surface charge. When the dielectric particle is exposed to an external electric field, positive charges will be induced on one side and the same amount of negative charges on the opposite side of the particle. The electrostatic forces resulting from these charges are canceled out if the electric field is uniform. When the particle is exposed to a non-uniform electric field, the force on one side of the particle will be greater than the other side. The net $F_{DEP}$ will is governed by equation (2) & (3):

$$F_{DEP}=2\cdot\pi\cdot r^3\cdot f_{CM}\cdot\nabla E_s \qquad (2)$$

$$f_{CM} = \frac{\sigma_c - \sigma_m}{\sigma_c + 2\sigma_m} \qquad (3)$$

where $f_{CM}$ is the Clausius-Mossotti factor, $\sigma_c$ and $\sigma_m$ are the electrical conductivity of the microorganism and suspending medium, respectively. If $f_{CM}>0$ (i.e., $\sigma_c>\sigma_m$), the particle experience positive $F_{DEP}$ and is directed towards high $E_s$; if $f_{CM}<0$ (i.e., $\sigma_c<\sigma_m$), the particle experience negative $F_{DEP}$ and is directed towards low $E_s$. For our case using CECIC to treat DI water ($\sigma_m$=~5.5 µS/m) containing *E. coli* cells ($\sigma_c$=~41 mS/m), $f_{CM}$ is positive and thus the force is pointed towards the center electrode. Consequently, both the electric force and dielectrophoresis force will drive the bacterial cells towards the center area of the CECIC, the hot spot for microbial inactivation as discussed above.

Figure 3D:
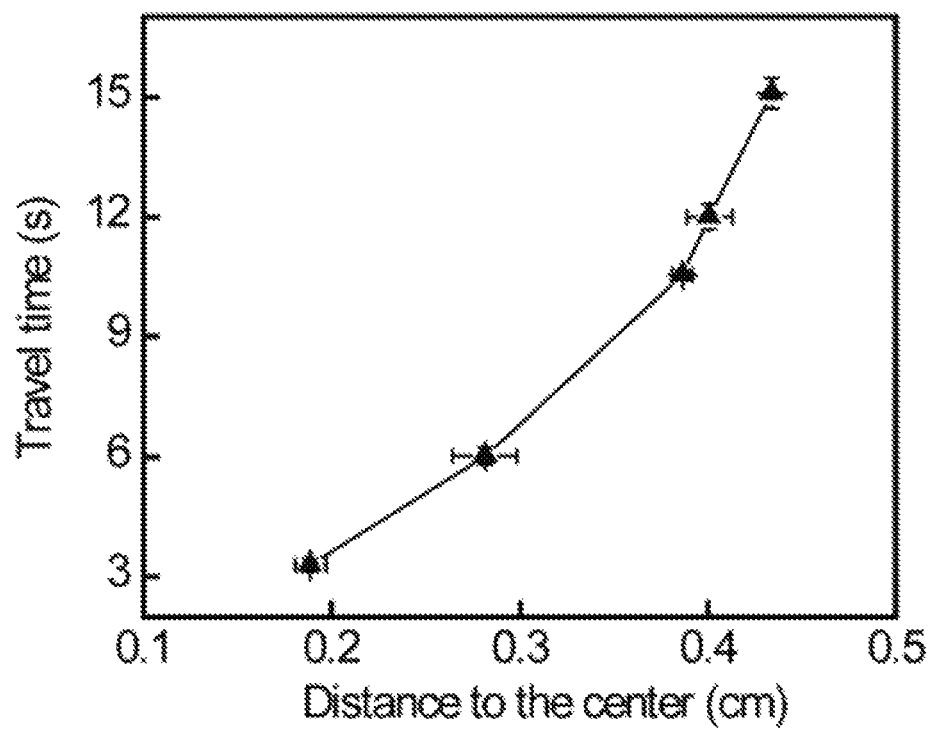
FIG. 3D provides simulated travel time of bacterial cells from various distance from the center electrode, in accordance with an exemplary embodiment of the present invention.

A 3D model has been built using the particle trajectory module in COMSOL Multiphysics to simulate the transportation of bacterial cells in the CECIC. After being injected uniformly into the reactor, the bacterial cells are transported by Brownian movement, the drag force of the laminar flow, gravity, the electrophoresis and dielectrophoresis forces of the non-uniform electric field. The simulation result illustrates that bacterial cells are moving towards the center electrode in the CECIC. Generally, the time required for bacteria to reach the center electrode increases with the distance to the center electrode (FIG. 3D). Nevertheless, in ~15 s, the farthest bacteria (the bacteria close to the outer electrode) can be transported to the center electrode, which is only one-fourth of the HRT (1 min). This result suggests that when water samples are treated by the CECIC with 1.5

V and 1 min HRT, the *E. coli* cells will travel to the vicinity of the center electrode with high electric field strength and high Cu concentrations.

Figure 3E:
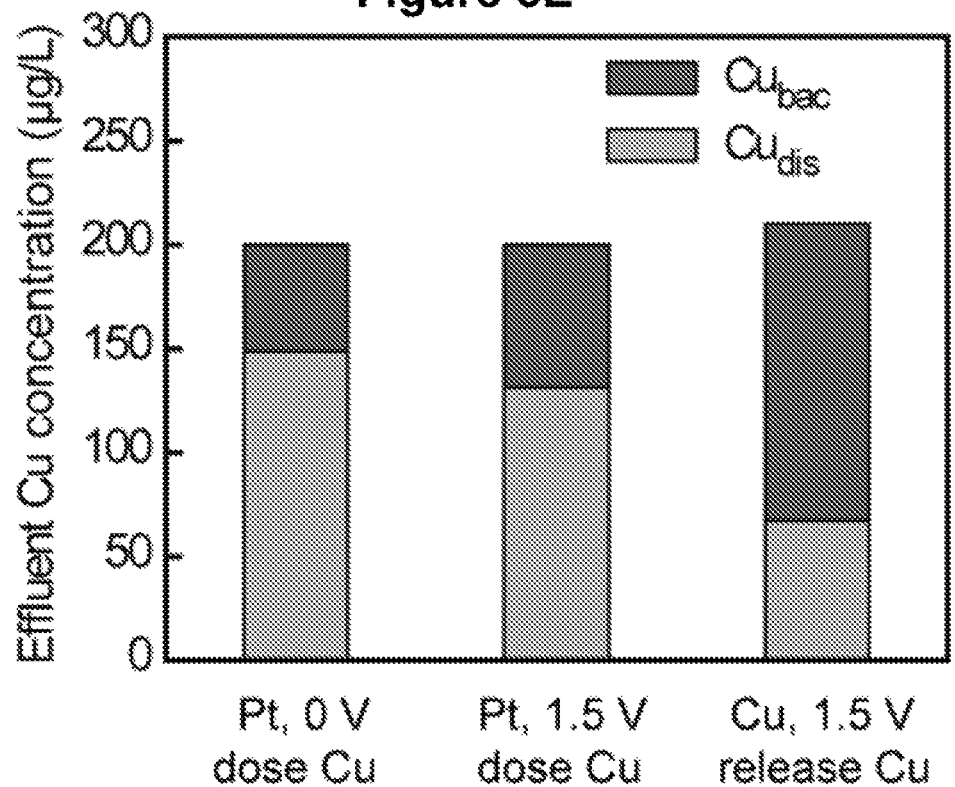
FIG. 3E provides fate of Cu of three conditions: a fluid disinfection system with a Pt center electrode operated with an applied voltage of 1.5 V, without an applied voltage, and a fluid disinfection system with a Cu center electrode at 1.5V, in accordance with an exemplary embodiment of the present invention.

Synergetic Effect of the Mechanisms in the CECIC Contributing to the High Inactivation Efficiency The fate of Cu in the previous experiments (FIGS. 2B and 3A) was investigated. Three different experimental conditions resulted in similar effluent Cu concentrations of ~200 μg/L: the normal condition when the CECIC with a Cu center electrode operated at 1.5 V and Cu ions were released in-situ by ionization, and the other two conditions when the CECIC with a Pt center electrode operated with or without an applied voltage of 1.5 V, respectively, and Cu ions (200 μg/L) were dosed intentionally to the water samples. The HRTs were all 1 min. As summarized in FIG. 3E, for the "Cu, 1.5 V, release Cu" condition, about 143 μg/L of Cu ions in the effluent are adsorbed or taken by *E. coli* cells. This value is more than double of that for the "Pt, 1.5 V, dose Cu" condition (68 μg/L) and more than triple of that for the "Pt, 0 V, dose Cu" condition (42 μg/L). These results confirm the above analysis, i.e., the synergetic effect of the electric field exposure, Cu concentration gradient, and bacterial cell transportation on the inactivation of *E. coli* in the CECIC.

Figure 4:
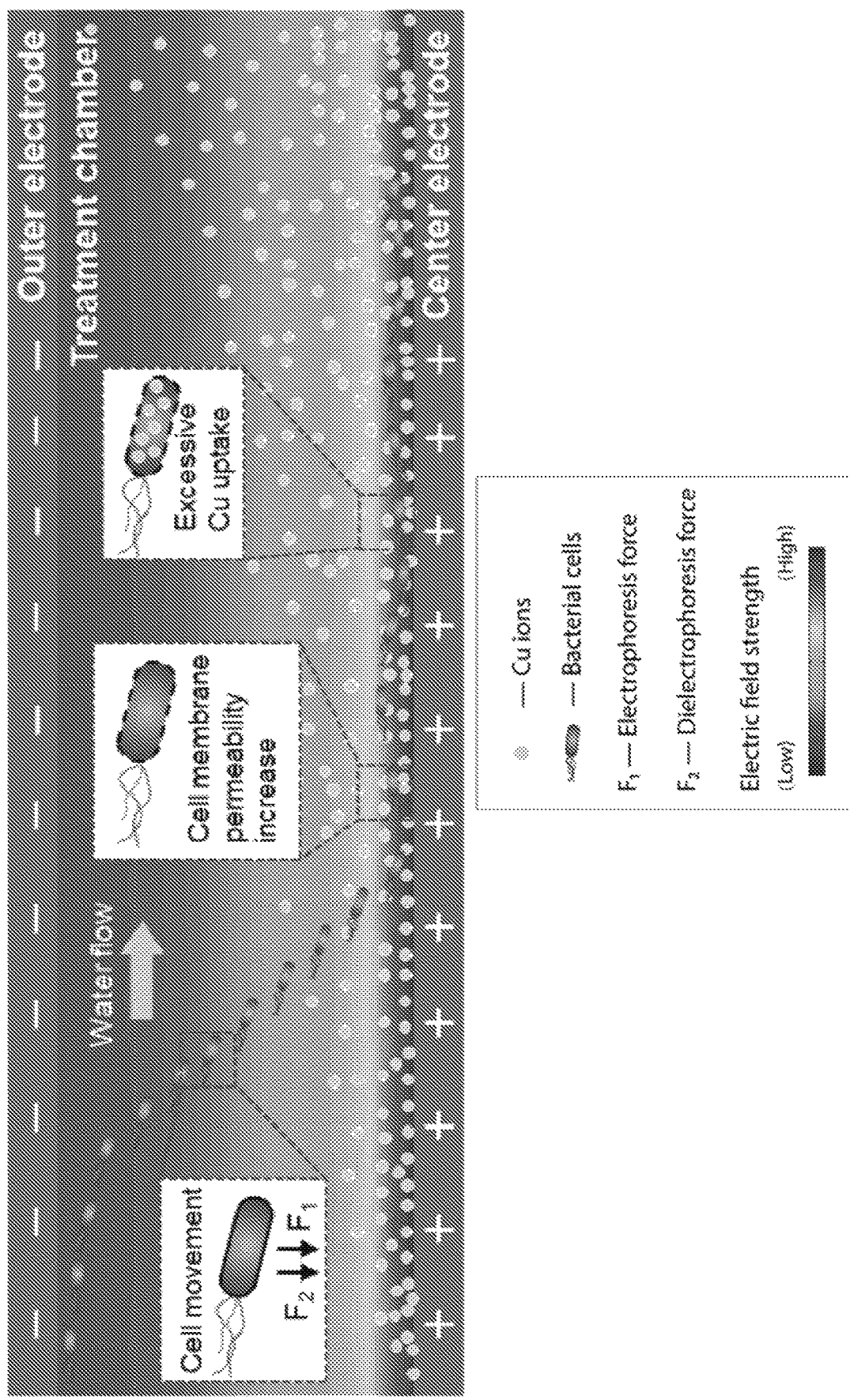
FIG. 4 provides a schematic summary of disinfection mechanisms in a fluid disinfection system, in accordance with an exemplary embodiment of the present invention.

FIG. 4 summarizes the mechanisms applied in the CECIC. Attributed to the rationally designed coaxial configuration, a non-uniform electric field is generated (the background color). The enhanced electric field near the center electrode causes the permeability increase of cell membrane, the excessive uptake of Cu ions, and thus the reinforced bacteria inactivation. The in-situ ionization generates a Cu ion concentration gradient (the distribution of yellow dots) where the concentration near the center electrode can reach >3000 μg/L. Lastly, being driven by the electrophoresis ($F_1$) and dielectrophoresis forces ($F_2$), the bacterial cells are transported to the vicinity of the center electrode, where both the electric field strength and Cu ion concentration are higher. These mechanisms in the CECIC synergistically result in the high inactivation efficiency with low Cu concentration in the effluent.

Performance Comparison Between the CECIC and the Conventional Planar-Electrode Copper Ionization Cell (PECIC)

The conventional CICs used in industry is implemented with two planar electrodes (PECIC) facing each other. This technology has been widely used for *Legionella* inactivation in hospital drinking water. The PECIC can also control the forming of biofilms in the water distribution system. During operation, a voltage is applied to enable copper release for disinfection and a uniform electric field is provided between electrodes with relatively low strength. A PECIC was constructed and the disinfection performance was tested.

Figure 5:
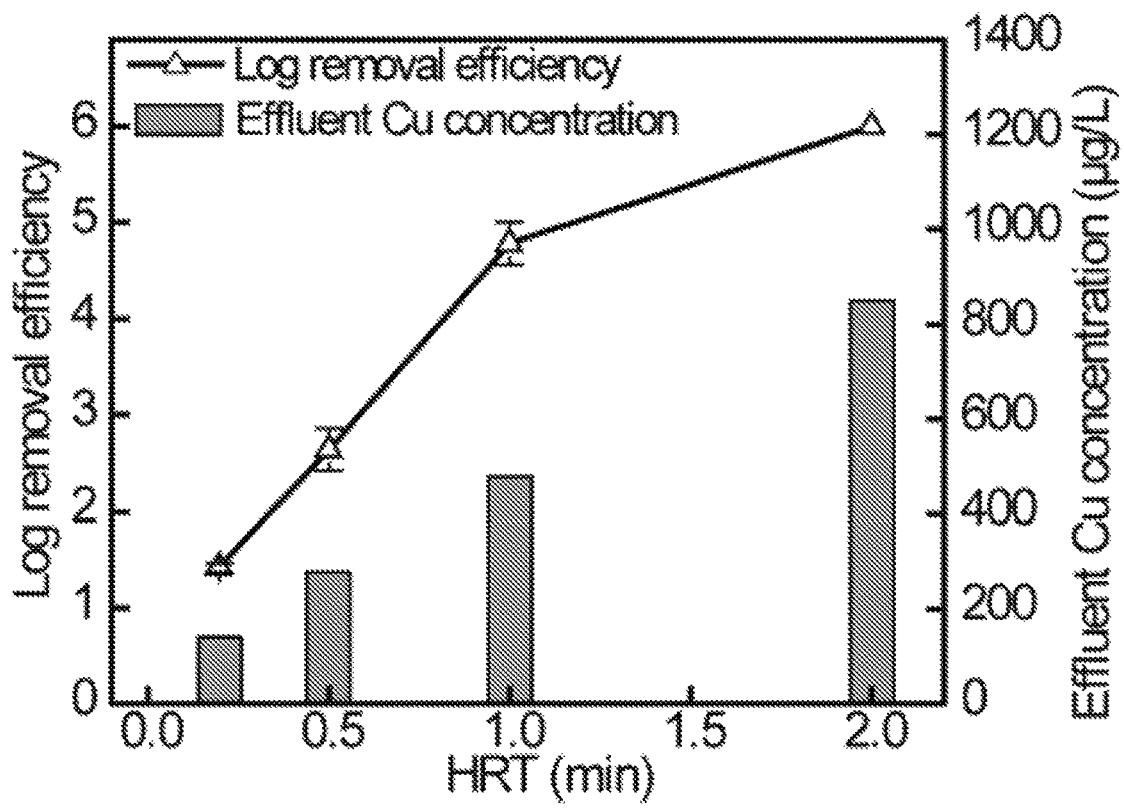
FIG. 5 provides log removal efficiency of *E. coli* and effluent Cu concentration using the PECIC at an operating voltage of 1.5V.

Compared with the CECIC, the PECIC showed both a lower disinfection performance and a higher Cu release under the same operation parameters (FIG. 5). When controlling the effluent copper concentration to a safe level (~200 μg/L), the removal efficiency only reached ~2 log, which was far below the effective CECIC of ~6-log removal. On the other hand, to reach the 6-log removal, the PECIC needed a higher voltage and resulted in a much higher Cu release.

Long-Term Operation of the CECIC and the Cost Estimation

Figure 6:
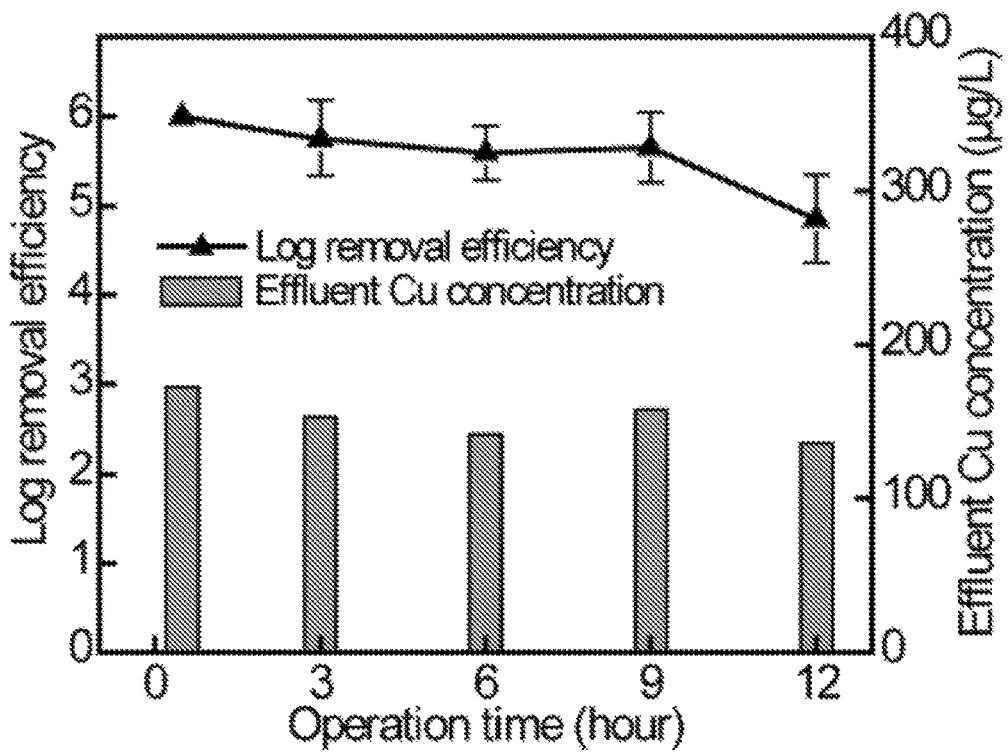
FIG. 6 provides long-term disinfection performance of a fluid disinfection system inactivating *E. coli* at 1.5V and one minute hydraulic retention time, in accordance with an exemplary embodiment of the present invention.

To investigate the long-term disinfection performance, a CECIC was operating continuously for 12 hours with a fixed HRT (1 min) and a fixed voltage (1.5 V). The total volume of the water sample treated is 7.2 L. As shown in FIG. 6, *E. coli* removal efficiencies are maintained higher than 5 logs. The slight decrease is probably due to the formation of the oxide layer covering the surface of the center electrode. The effluent copper concentration remained in a stable range of 136-172 μg/L.

The cost of the CECIC operation can be estimated by considering the consumption of electricity and the loss of center electrode as Cu ion release. If the center Cu electrode is changed based on a 12-hour period, the material cost is about $0.1/m^3$, which is lower than or similar to the cost of other municipal water treatment processes. Compared with the material cost, the electricity cost is very low (0.9 J/L, <0.1% of the total cost) if the CECIC is powered by grid electricity. The CECIC can also be powered by commercially available AA batteries (2,500 mAh, 1.5 V). One such battery allows the CECIC to treat as much as 14 $m^3$ of water for 25,000 hours.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A system comprising:
   a fluid flowing through an internal cavity with a hydraulic retention time;
   an outer electrode comprising at least one outer electrode metal selected from the group consisting of copper, zinc, and silver, an inner surface of the outer electrode defining the internal cavity and having a first end and a second end;
   a center electrode having a diameter of between 50 μm and 100 μm and an outer surface, the center electrode comprising at least one center electrode metal selected from the group consisting of copper, zinc, and silver and positioned coaxially within the internal cavity;
   a voltage supply configured to:
      supply a voltage of 1.5V across the outer electrode and the center electrode;
      generate a non-uniform electric field distribution on a cross-sectional plane of the system; and
      limit an increase of a concentration of the at least one center electrode metal to the fluid to between 150 μg/L and 250 μg/L measured at the second end of the outer electrode; and a fluidic path having an inlet and an outlet, the fluidic path allowing the fluid to pass from an area external the first end of the outer electrode, through the internal cavity, and to an area external the second end of the outer electrode;

wherein the non-uniform electric field distribution is represented by:

$$E_s = \frac{U}{s \cdot \ln\frac{r_{center}}{r_{outer}}};$$

wherein:
  $E_s$ is the magnitude of the electric field at a position on the cross-sectional plane at a distance s from the center;
  U is the voltage across the outer electrode and the center electrode;
  $r_{center}$ is the radius of the center electrode; and
  $r_{outer}$ is the radius of the outer electrode; and
wherein the system provides for the non-uniform electric field with enhanced strength generated near the center electrode attributed to:
  the coaxial arrangement of the center electrode within the outer electrode; and
  a selection of the sizes of the center electrode and outer electrode, which define a gap distance defined between the outer surface of the center electrode and the inner surface of the outer electrode.

2. The system of claim 1, wherein:
the outer electrode is a cylindrically-shaped outer electrode; and
the center electrode extends along at least a portion of a longitudinal axis of the outer electrode.

3. The system of claim 1 further comprising a body comprising acrylic surrounding the outer electrode.

4. The system of claim 1, wherein the fluid is water.

5. A method for disinfecting a fluid including a contaminant comprising:
  providing the system of claim 1;
  passing the fluid through the fluidic path; and
  applying the voltage across the center electrode and the outer electrode.

6. The method of claim 5, wherein the center electrode has a diameter of between 70 μm and 80 μm.

7. The method of claim 5, wherein the fluid is water.

8. The system of claim 1, wherein the outer electrode metal and the center electrode metal is copper.

9. The system of claim 8, wherein the voltage supply is configured to limit the increase in the concentration of copper to the fluid to between 175 μg/L and 225 μg/L measured at the fluidic path outlet.

10. The system of claim 1, wherein the center electrode has a diameter of between 70 μm and 80 μm.

11. The system of claim 1, wherein at least one of the outer electrode metal or the center electrode metal is silver.

12. The system of claim 1, wherein at least one of the outer electrode metal or the center electrode metal is zinc.

13. The system of claim 1, wherein $E_s > 100$ V/cm.

14. The system of claim 1, wherein $E_s > 1000$ V/cm.

15. The method of claim 5, wherein the contaminant is bacteria; and
  wherein, upon supply of the voltage, the bacteria in the fluid are transported towards the center electrode because of electrophoretic and dielectrophoretic forces.

16. The system of claim 1, wherein:
the center electrode metal and outer electrode metal is copper; and
a copper concentration gradient presents a higher copper concentration in proximity of the center electrode than a lower copper concentration in proximity of the outer electrode.

17. A system comprising:
an outer electrode comprising an outer electrode metal, the outer electrode having an inlet, an outlet, and an inner surface defining an internal cavity;
a center electrode coaxially arranged within the internal cavity of the outer electrode, the outer electrode comprising a center electrode metal, and the center electrode having a diameter of between 50 μm and 100 μm and an outer surface;
a fluidic path configured for a fluid with a contaminant to flow therethrough, the fluidic path extending from a fluidic path inlet at the inlet of the outer electrode to a fluidic path outlet at the outlet of the outer electrode; and
a voltage supply configured to:
  supply a voltage of 3V or less across the outer electrode and the center electrode; and
  generate a non-uniform electric field distribution on a cross-sectional plane of the system, the non-uniform electric field distribution represented by:

$$E_s = \frac{U}{s \cdot \ln\frac{r_{center}}{r_{outer}}};$$

wherein:
  $E_s$ is the magnitude of the electric field at a position on the cross-sectional plane at a distance s from the center;
  U is the voltage across the outer electrode and the center electrode;
  $r_{center}$ is the radius of the center electrode; and
  $r_{outer}$ is the radius of the outer electrode;
wherein the system:
  is configured to limit an increase of a concentration of the center electrode metal to the fluid from an inlet metal concentration measured at the fluidic path inlet to less than 25% of the US Environmental Protection Agency's (EPA) maximum contaminant level (MCL) for the center electrode metal in public water systems measured at the fluidic path outlet;
  is configured to reduce a concentration of the contaminant in the fluid from an inlet contaminant concentration measured at the fluidic path inlet to an outlet contaminant concentration measured at the fluidic path inlet outlet at an efficiency of at least 5 log; and
  provides for the non-uniform electric field with enhanced strength generated near the center electrode attributed to:
    the coaxial arrangement of the center electrode within the outer electrode; and
    a selection of the sizes of the center electrode and outer electrode, which define a gap distance defined between the outer surface of the center electrode and the inner surface of the outer electrode.

18. The system of claim 17 further comprising the fluid; wherein:
the voltage supply is configured to supply a voltage of between 1.0-3.0 V; and the system is:
  configured to limit the outlet metal concentration to less than 300 µg/L;
  configured to reduce the contaminant concentration at an efficiency of at least 6 log; and
  further configured to provide the fluid with a hydraulic retention time through the fluidic path of five minutes or less.

19. The system of claim 17 further comprising the fluid; wherein:
  the outer electrode metal is selected from the group consisting of copper, zinc, and silver;
  the center electrode metal is selected from the group consisting of copper, zinc, and silver;
  the voltage supply is configured to supply a voltage of 1.5 V; and
  the system is:
    configured to limit the outlet metal concentration to between 150 µg/L and 250 µg/L; and
    further configured to provide the fluid with a hydraulic retention time through the fluidic path of one minute.

20. The system of claim 17 further comprising the fluid; wherein:
  the contaminant is *E. coli*; and
  the system is configured to reduce the *E. coli* concentration at an efficiency of at least 6 log.

21. The system of claim 17, wherein the center electrode has a diameter of between 70 µm and 80 µm.

22. The system of claim 17, wherein at least one of the outer electrode metal or the center electrode metal is copper.

23. The system of claim 17, wherein at least one of the outer electrode metal or the center electrode metal is silver.

24. The system of claim 17, wherein at least one of the outer electrode metal or the center electrode metal is zinc.

25. The system of claim 17, wherein $E_s > 100$ V/cm.

26. The system of claim 17, wherein $E_s > 1000$ V/cm.

27. A method comprising:
  providing the system of claim 17;
  passing the fluid through the fluidic path; and
  applying the voltage across the center electrode and the outer electrode.

* * * * *